(12) United States Patent
Dixon et al.

(10) Patent No.: US 6,715,717 B2
(45) Date of Patent: Apr. 6, 2004

(54) METHOD AND APPARATUS FOR INDUCING CONTROLLED VORTICES TO REDUCE AFTERBODY DRAG

(76) Inventors: Charles J. Dixon, 1712 Victoria Way, Kennesaw, GA (US) 30152; Arthur C. Hughes, 3307 Somerset Ct., Marietta, GA (US) 30067

( * ) Notice: Subject to any disclaimer, the term of this patent is extended or adjusted under 35 U.S.C. 154(b) by 37 days.

(21) Appl. No.: 10/236,726

(22) Filed: Sep. 6, 2002

(65) Prior Publication Data

US 2004/0046086 A1 Mar. 11, 2004

(51) Int. Cl.$^7$ ................................................. B64C 23/06
(52) U.S. Cl. ........................................ 244/130; 244/199
(58) Field of Search ................................ 244/200, 199, 244/213, 91, 130

(56) References Cited

U.S. PATENT DOCUMENTS

| | | | |
|---|---|---|---|
| 3,384,326 A | 5/1968 | Neubeck | |
| 3,419,232 A | 12/1968 | McStay et al. | |
| 3,578,264 A | 5/1971 | Kuethe | |
| 3,604,661 A | 9/1971 | Mayer | |
| 3,680,816 A | 8/1972 | Mello | |
| 4,114,836 A | 9/1978 | Graham et al. | |
| 4,174,083 A | 11/1979 | Mohn | |
| 4,378,922 A | 4/1983 | Pierce | |
| 4,455,045 A | 6/1984 | Wheeler | |
| 4,569,494 A | 2/1986 | Sakata | |
| 4,706,910 A | 11/1987 | Walsh et al. | |
| 4,718,620 A | 1/1988 | Braden et al. | |
| 4,836,473 A | 6/1989 | Aulehla et al. | |
| 4,932,612 A | 6/1990 | Blackwelder et al. | |
| 5,069,402 A | 12/1991 | Wortman | |
| 5,374,013 A | * 12/1994 | Bassett et al. | ............... 244/130 |
| 5,901,925 A | 5/1999 | McGrath et al. | |
| 6,202,959 B1 | 3/2001 | Hyde | |
| 6,318,677 B1 | 11/2001 | Dixon | |

OTHER PUBLICATIONS

The Aviation History On–Line Museum, "www.aviation-history.com/theory/lam–flow.htm".

* cited by examiner

*Primary Examiner*—Galen L. Barefoot
(74) *Attorney, Agent, or Firm*—Myers & Kaplan, LLC; Joel D. Myers; Ashish D. Patel

(57) ABSTRACT

A method and apparatus of creating vortices via vortex controllers, wherein the vortices are capable of entraining high-energy surrounding flow to induce a series of powerful longitudinal vortices that reattach separated flow by merging into single vortices along the undersurface of the afterbody to reenergize the fuselage boundary layer, thus preventing undersurface flow separation and reducing overall afterbody drag.

16 Claims, 6 Drawing Sheets

FLOW CONDITIONS FOR BASIC WING/BODY COMBINATION

SECTION THROUGH AFTERBODY PARALLEL TO STREAMLINES

EFFECT OF VCD INSTALLATION ON AFTERBODY FLOW

FIGURE 5
TYPICAL VCD SHAPES
PLAN VIEWS
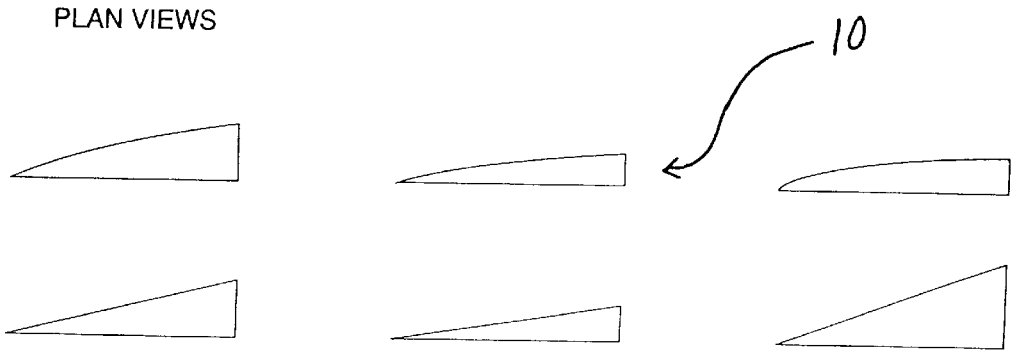
CROSS SECTIONS AT FUSELAGE STATIONS
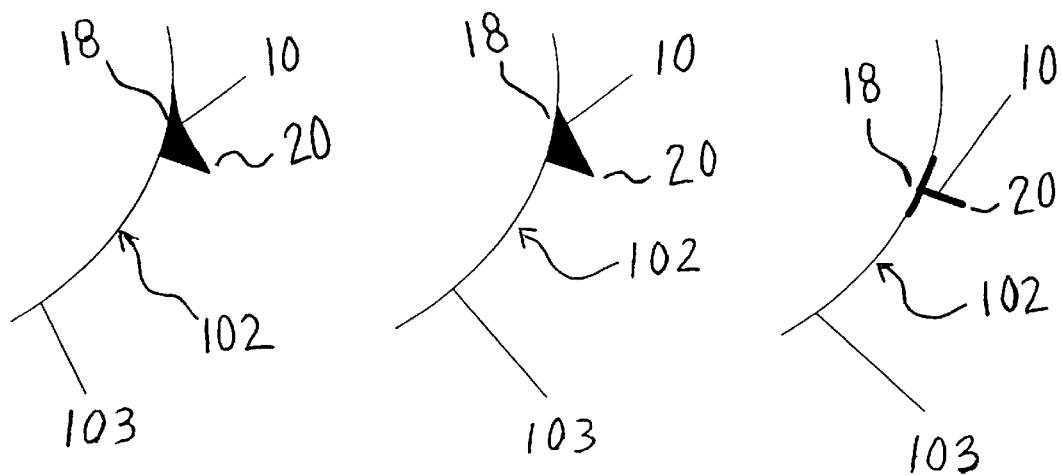
FIGURE 5A

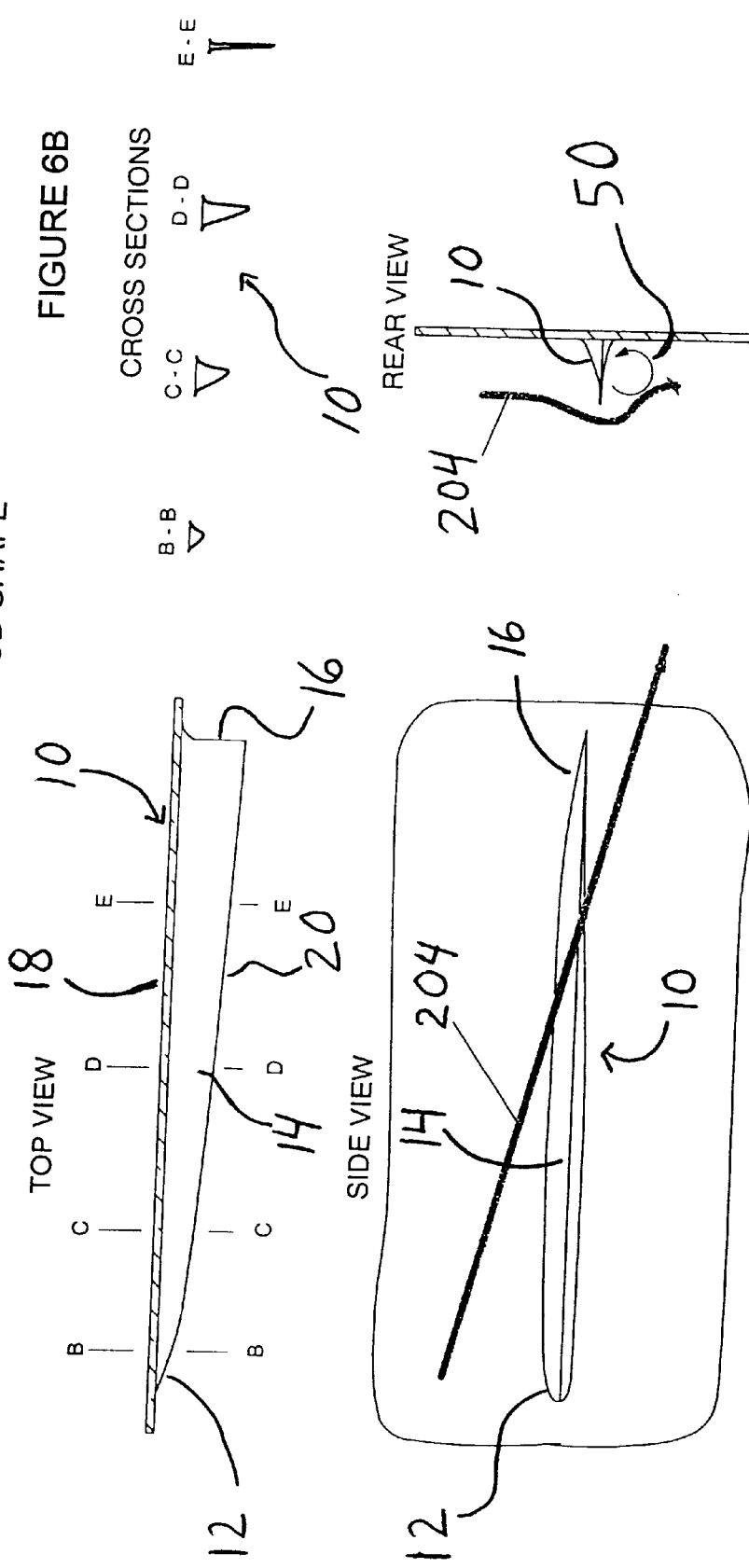

METHOD AND APPARATUS FOR INDUCING CONTROLLED VORTICES TO REDUCE AFTERBODY DRAG

TECHNICAL FIELD

The present invention relates generally to manipulation of fluid flow characteristics of airplane fuselage afterbodies, and more specifically to vortex controllers and method therefor designed to manipulate and control surrounding flow and thus reduce afterbody drag due to flow separation and drag-producing trailing vortices. The present invention is particularly suitable for, although not strictly limited to, application to upswept fuselage afterbodies characteristic of aft-loading freight/cargo aircraft such as the C-13.

BACKGROUND OF THE INVENTION

Typically, the design configuration of freight transport aircraft is substantially contingent upon loading and airdrop considerations, fuel economy consideration, and other optimal operational requirements. The result of such design dependencies generally yields a cargo aircraft possessing an upswept afterbody. As such, when subjected to the fluid flow field, such aircraft experience a crossflow on their afterbody due to wing downwash, resulting in increased flow separation on the undersurface of the afterbody. The resulting flow separation imparts a substantial amount of drag upon the afterbody and thus, reduces the overall performance of the aircraft through the flow field.

Although many attempts have been made to reduce afterbody drag via vortex generator devices attached to the upswept fuselage afterbody of the aircraft, such devices have proven effective on isolated fuselage bodies only, and have neglected to contemplate afterbody drag experienced by wing/body combinations. Strakes of various shapes and sizes attached to the afterbody have also been utilized in attempts to reduce afterbody drag, but have, however, been only marginally successful in drag reduction and local flow redirection due to wing downwash.

In general, most attempts to reduce drag experienced by sharply upswept afterbodies have proven unsuccessful due to the lack of appreciation of crossflow on the afterbody as a result of wing downwash, wherein the crossflow greatly exacerbates flow separation along the undersurface of the upswept afterbody and thus, increases afterbody drag.

Therefore, it is readily apparent that there is a need for vortex controllers that induce a series of longitudinal vortices that entrain high energy flow along the undersurface of the afterbody to prevent undersurface flow separation, thereby reducing overall afterbody drag.

BRIEF SUMMARY OF THE INVENTION

Briefly described, in a preferred embodiment, the present invention overcomes the above-mentioned disadvantages, and meets the recognized need for such a method and device by providing vortex controllers that induce a series of powerful longitudinal vortices that entrain high energy flow along the undersurface of the afterbody to reenergize the fuselage boundary layer and thus prevent undersurface flow separation, thereby reducing overall afterbody drag.

According to its major aspects and broadly stated, the present invention in its preferred form are vortex controllers in the form of fin-like projections strategically placed, wherein cross section centerlines are essentially normal to the local fuselage.

More specifically, the present invention is a plurality of substantially parallel vortex controllers in the form of fin-like projections each having a generally triangular-shaped cross-section, each vortex controller is preferably strategically placed, wherein cross section centerlines are essentially normal to the local fuselage. Each vortex controller is preferably positioned on the fuselage afterbody to ensure flow reattachment along the length of the afterbody. Each vortex controller is further preferably positioned and designed to ensure that the merging of each of the induced longitudinal vortices produced by each of the vortex controllers will create a stable single combined/merged powerful vortex along each side of the afterbody. The vortices along each side of the fuselage afterbody preferably reenergize the fuselage boundary layer and thus prevent local undersurface flow separation, thereby reducing overall afterbody drag.

A feature and advantage of the present invention is its ability to provide a method to reduce aircraft afterbody drag.

A feature and advantage of the present invention is its ability to provide a method to reduce the afterbody drag experienced by aircraft having an upswept fuselage afterbody.

A feature and advantage of the present invention is its ability to be applied to pre-existing aircraft.

A feature and advantage of the present invention is its ability to be integrally formed with an aircraft afterbody during manufacture of the same.

A feature and advantage of the present invention is its ability to provide a method and apparatus to create small powerful vortices that flow proximal to the afterbody surface and entrain flow into areas typically subjected to flow separation, thereby reducing and/or eliminating the same.

A feature and advantage of the present invention is its ability to provide a method and apparatus to entrain high-energy airflow and redirect such airflow along the undersurface of an upswept fuselage afterbody and thereby reenergize the fuselage boundary layer, prevent local undersurface flow separation and reduce overall afterbody drag.

A feature and advantage of the present invention is its ability to provide a method to combine a plurality of induced longitudinal vortices to produce a single powerful merged vortex along each side of an upswept fuselage, wherein the merged vortices remain proximal to the outer edges of the undersurface of an upswept fuselage afterbody, thus eliminating boundary layer separation from the undersurface between the merged vortices.

A feature and advantage of the present invention is its ability to be combined in any number, size, shape and angle of attack to effectuate any desirable induced vortex of appropriate strength to control flow separation and reduce afterbody drag associated with any style, shape and/or design of aircraft afterbody.

A feature and advantage of the present invention is its effective and strategic design, placement and positioning of the vortex controllers in contemplation of wing downwash and the resulting crossflow on the afterbody.

A feature and advantage of the present invention is its contemplation of afterbody streamlines in the effective and strategic design, placement, positioning and/or alignment of the vortex controllers.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structures and refer to like elements throughout, and in which:

FIG. 3A is a cross-sectional view of the afterbody of FIG. 2 along lines 3—3 showing the afterbody streamlines of FIG. 1 and vortex controllers according to a preferred embodiment of the present invention.

FIG. 5 depicts plan views of various vortex controllers according to a preferred embodiment of the present invention.

FIG. 5A depicts cross sections of various vortex controllers according to a preferred embodiment of the present invention and positioned on an aircraft fuselage.

FIG. 6 is a plan view of a vortex controller according to a preferred embodiment of the present invention.

FIG. 6A is a side view of the vortex controller of FIG. 6 according to a preferred embodiment of the present invention.

FIG. 6B depicts cross-sectional views of the vortex controller of FIG. 6 according to a preferred embodiment of the present invention.

FIG. 6C is a rear view of the vortex controller of FIG. 6 according to a preferred embodiment of the present invention.

DETAILED DESCRIPTION OF THE PREFERRED AND ALTERNATIVE EMBODIMENTS

In describing the preferred and alternate embodiments of the present invention, as illustrated in FIGS. 1–6, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
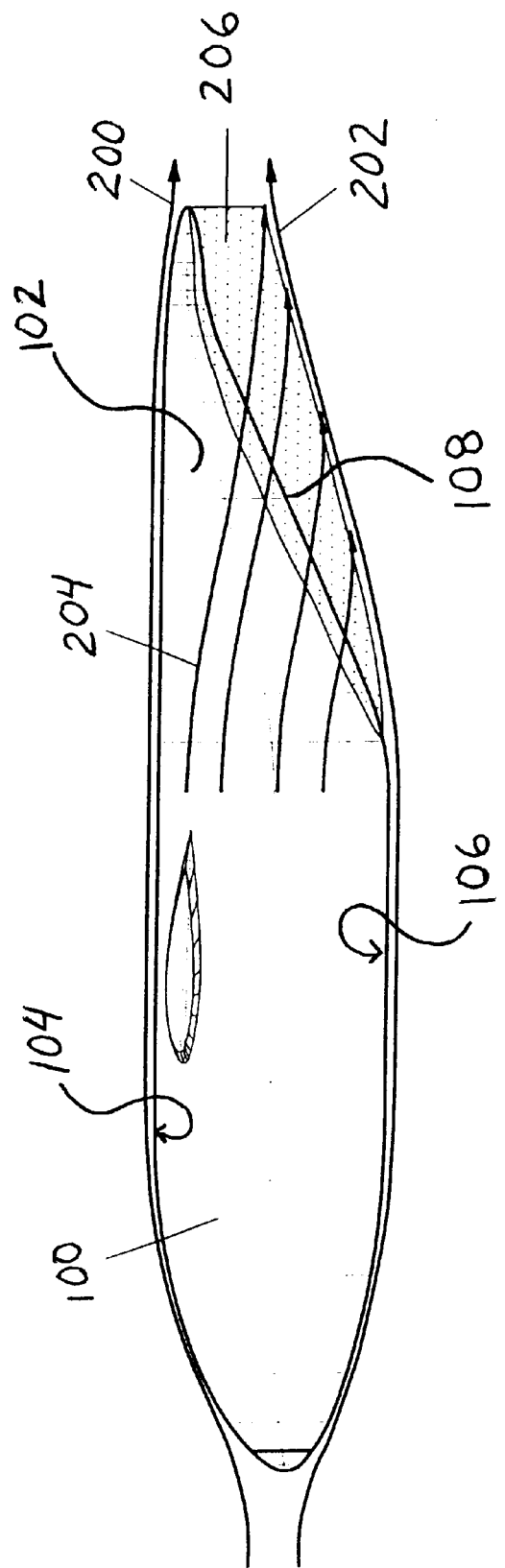
FIG. 1 is a side view of a generic wing/body combination with an upswept afterbody, showing typical upswept afterbody streamlines and the area of separated flow on the afterbody.

Referring now to FIG. 1, illustrated therein is a generic wing/body combination 100 having an upswept afterbody 102. Proper application, positioning and alignment of the present invention onto wing/body combination 100, and more specifically onto afterbody 102, requires the ascertainment of specific information and data regarding flow conditions and boundary layer separation, such as the direction of streamlines along the afterbody 102, upper body center line 104 and lower body center line 106, the approximate location of the boundaries of separated flow, the approximate physical thickness of the boundary layer displacement thickness along the afterbody streamlines upstream of the separation point, and the local velocity and Mach number along the afterbody streamlines, wherein such information may be obtained either experimentally and/or from an analytical evaluation of the specific airplane design. As such, FIG. 1, further illustrates upper body streamline 200 flowing along upper body center line 104; lower body streamline 202 flowing along lower body center line 106; afterbody streamlines 204 flowing along afterbody 102; and region of separated flow 206. As more fully described below, flow separation along undersurface 108 of upswept afterbody 102 is greatly exacerbated by crossflow on afterbody 102 imparted thereon via wing downwash, wherein such crossflow significantly increases the physical boundaries and thickness of region of separated flow 206, and thus, overall afterbody drag.

Figure 2:
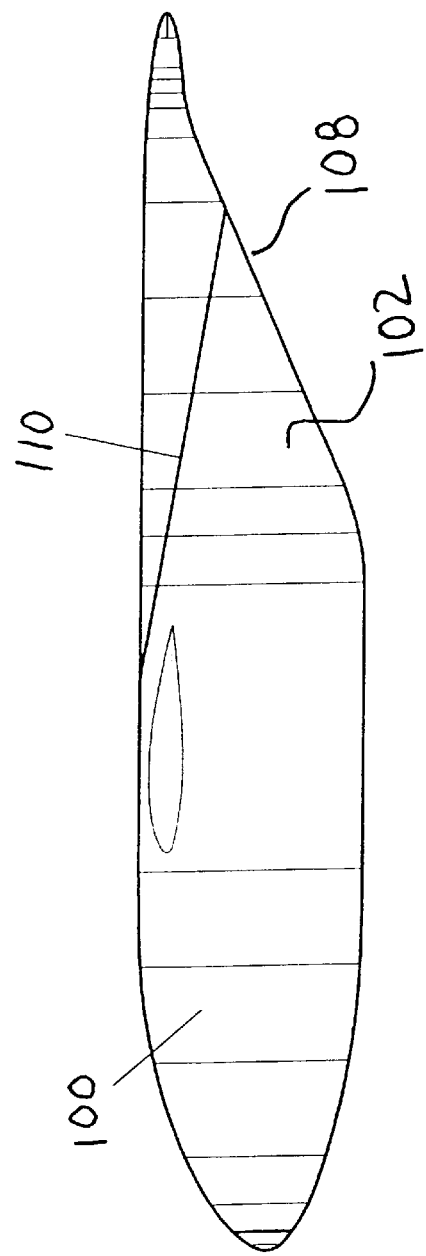
FIG. 2 is a side view of a generic wing/body combination with an upswept afterbody, showing the location of an afterbody cross-section parallel to the afterbody streamlines of FIG. 1.

Referring now to FIG. 2, illustrated therein is a side view of wing/body combination 100 with an upswept afterbody 102, showing the location of an afterbody cross-section 110 parallel to afterbody streamlines 204 of FIG. 1.

Figure 3:
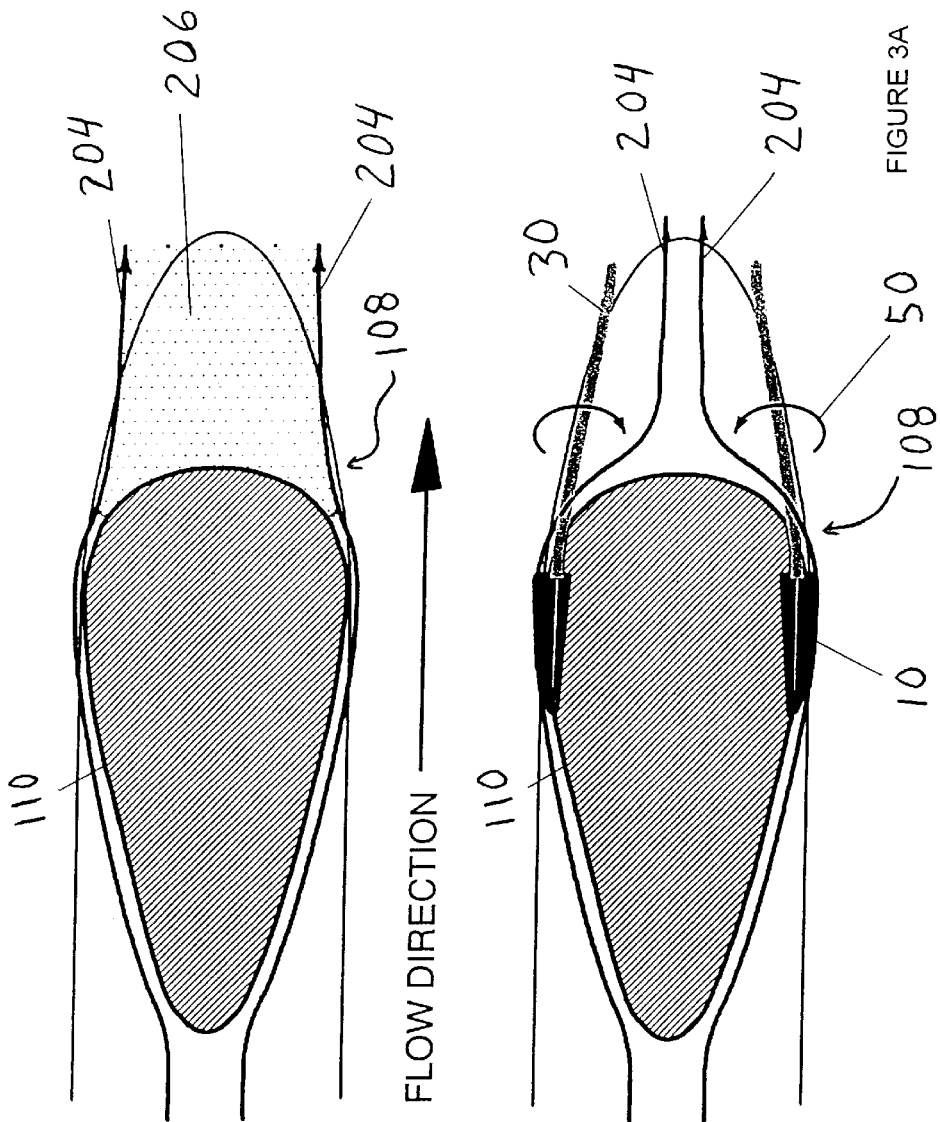
FIG. 3 is a cross-sectional view of the afterbody of FIG. 2 along lines 3—3 showing the afterbody streamlines of FIG. 1.

Referring now to FIGS. 3–3A, illustrated therein are cross-sectional views of afterbody 102 along cross-section 110 of FIG. 2, wherein afterbody streamlines 204 are further illustrated thereon. Afterbody streamlines 204 typically travel down and across afterbody 102 due to both wing downwash and the upswept shape of afterbody 102. As the corners of upswept afterbody 102 are entirely too sharp for afterbody streamlines 204 to stay attached and/or travel closely thereto, a circulatory flow separation along undersurface 108 of afterbody 102 occurs, resulting in region of separated flow 206. However, as best illustrated in FIG. 3A, proper methodology and placement of vortex control devices (VCDs) 10 along afterbody 102 induce tightly-wound longitudinal vortices 50 along undersurface 108, just above the location where flow separation occurs, wherein vortices 50 preferably stay attached and/or travel closely to afterbody 102 and undersurface 108, entraining the surrounding flow and re-energizing the boundary layer of afterbody 102 to prevent flow separation thereabout.

Preferably, vortices 50 created by VCDs 10 travel in an inwardly circulatory direction, thus entraining afterbody streamlines 204 closer together and forcing them to travel closely along undersurface 108 of afterbody 102, as best illustrated in FIG. 3A. As a result, region of separated flow 206 is eliminated or significantly reduced in overall size and thickness, wherein the elimination/reduction of region of separated flow 206 significantly reduces the afterbody drag imparted on afterbody 102, and preferably allows lower body streamline 202 to travel/flow closely along lower body center line 106 of afterbody 102, thereby also contributing to the overall reduction in afterbody drag, as more fully described below. Additionally, to ensure that vortices 50 substantially influence region of separated flow 206/boundary layer, vortices 50 must preferably possess as small a vortex core 30 as possible, wherein the size of vortex core 30 is dependent upon the design and specific application of VCDs 10, as more fully described below.

Figure 4:
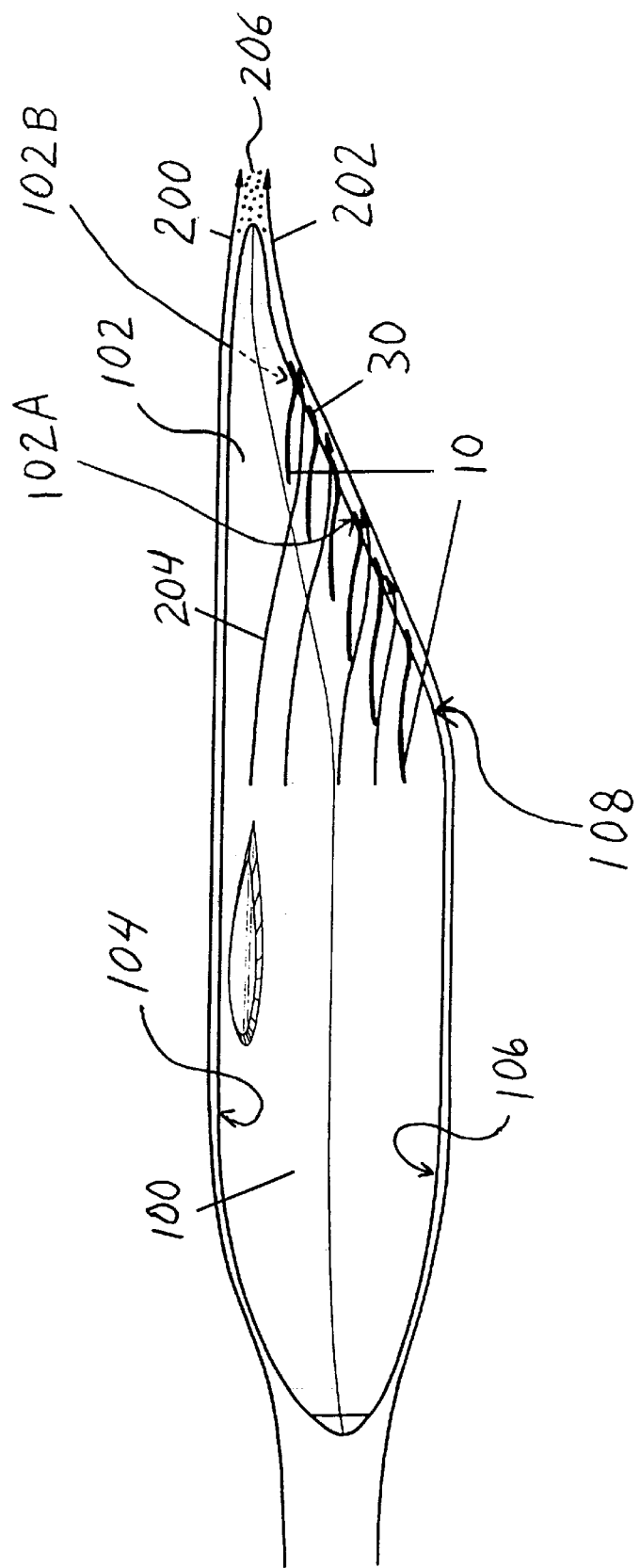
FIG. 4 is a side view of a generic wing/body combination with an upswept afterbody, showing effect of the vortex controllers on afterbody separation according to a preferred embodiment of the present invention.

Referring now to FIG. 4, illustrated therein is a side view of wing/body combination 100 with an upswept afterbody 102, depicting VCDs 10 positioned thereon and the effects of VCDs 10 on afterbody streamlines 204 flowing along afterbody 102, upper body streamline 200 flowing along upper body center line 104, and lower body streamline 202 flowing along lower body center line 106. Specifically, VCDs 10, and vortices 50 induced thereby, preferably influence afterbody streamlines 204 to stay attached and/or travel closely over and around corners 102A and 102B of upswept afterbody 102, thus allowing lower body streamline 202 flowing along lower body center line 106 to adhere more closely to undersurface 108 of afterbody 102 as well, thereby ensuring maximum reduction of region of separated flow 206 and thus, the overall reduction/elimination of afterbody drag imparted on upswept afterbody 102. Comparison of region of separated flow 206 of wing/body combination 100 without VCDs 10 (as best illustrated in FIG. 1) with region of separated flow 206 of wing/body combination 100 with VCDs 10 (as best illustrated in FIG. 4), effectively demonstrates the effect of a VCD 10 induced vortex 50 on the reduction of boundary layer separation—the reduction/elimination of region of separated flow 206.

As flow separation is inherently a boundary layer problem, a small diametered vortex core 30 of a strong vortex 50 will adhere more closely to the fuselage surface of afterbody 102 as vortex 50 trails aft therefrom, thereby entraining high-energy flow and re-energizing the boundary layer to reduce/eliminate flow separation and resulting drag. The relative size, alignment, number, positioning and, to some extent, the shape of VCD 10 is largely dependent upon the application of VCD 10, as the size of VCD 10 is primarily a function of the boundary layer at a specific location and operating condition, and wherein the shape of VCD 10 is influenced by the geometry of afterbody 102 and local Mach number at design operating conditions. Additionally, the direction of afterbody streamlines 204 at design conditions also determines the alignment of VCD 10 relative to afterbody streamlines 204, wherein VCD 10 is generally preferably aligned at an angle of 10 to 20 degrees to local afterbody streamlines 204 to ensure effective influence of induced vortices 50 on region of separated flow 206.

Referring now to FIGS. 5–6C, according to a preferred embodiment of the present invention, VCDs 10 are preferably fin-like, parabolic-shaped members generally having curved leading edge 12 in the plan view, a progressively thicker center body region 14 and thin aft end/trailing edge 16, wherein flat side 18 of VCD 10 preferably attaches to fuselage surface 103 of afterbody 102, such that opposing thin side 20 of VCD 10 projects therefrom.

Preferably, a VCD 10 is positioned on fuselage 103 of afterbody 102 such that aft end 16 of VCD 10 sits preferably just above region of separated flow 206 along undersurface 108 of afterbody 102. Leading edge 12 of VCD 10 is preferably located such that the longitudinal axis of VCD 10 is between 10 and 20 degrees nose-down from local afterbody streamline 204 at the design case, as best illustrated in FIG. 6A. The design case is generally climb or cruise, wherein alignment of VCD 10 is preferably adjusted to best maximize the effect of either design case.

Preferably, the number and size of VCDs 10 is dependent upon the specific application of VCDs 10. Generally, the size of VCDs 10 is dictated primarily by flow conditions, wherein the number of VCDs 10 is determined by the size of the aircraft afterbody 102 being treated. The maximum longitudinal spacing of each VCD 10 on fuselage surface 103 of afterbody 102 is preferably based upon the predicted size and stability of the vortex generated by each VCD 10, wherein the trailing edge 16 of a VCD 10 is preferably positioned forward of the unstable location of the most forward/previous VCD 10 induced vortex; although, VCD spacing may be altered and/or influenced by the specific size and shape of the afterbody 102 being treated.

Preferably, appropriate selection alignment, positioning and spacing of VCDs 10 enables a vortex 50 produced by one VCD 10 to combine with a vortex 50 induced by a preceding VCD 10, wherein a series of powerful longitudinal vortices 50 preferably merge into a single combined vortex 50 that travels along undersurface 108 of afterbody 102 to reenergize the fuselage boundary layer, thus preventing flow separation along undersurface 108 and reducing overall afterbody drag. Preferably, a series of VCDs 10 placed on opposing sides of fuselage 103 of afterbody 102 each preferably contribute to the formation of separate merged vortices 50, wherein each independent merged vortex 50 preferably travels along their respective sides of fuselage 103 and then along undersurface 108 to prevent flow separation thereabout. As the rate of growth of strength of the merged vortices 50 must be large enough to maintain the overall stability of the merged vortices 50 and prevent premature bursting thereof, the number, size and angle of attack of each VCD 10 is preferably designed so that each VCD 10 generates a vortex 50 of appropriate strength to meet this criterion.

It is contemplated in another alternate embodiment that any number, size and shape of VCDs 10 could be placed on afterbody 102 of wing/body combination 100.

It is contemplated in another alternate embodiment that VCDs 10 could be positioned, aligned, angled and/or spaced in any effective manner that best contributes to the reduction and/or elimination of afterbody drag and/or overall wing/body combination 100 drag.

It is contemplated in another alternate embodiment that VCDs 10 could be utilized on any type of aircraft that possesses an afterbody shape that causes flow separation.

It is contemplated in still another alternate embodiment that VCDs 10 could be utilized on any type of ground, air and/or aquatic vehicle including, but not limited to, racecars, motorcycles, drag racers, submarines, boats of any type, hovercrafts, blimps, and/or helicopters, so as to reduce drag commonly associated therewith and/or for stability.

It is contemplated in yet another alternate embodiment that VCDs 10 could be utilized on any type of missile and/or airborne combat weapon to reduce drag commonly associated therewith and/or for overall flight stability.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A vortex controller for reducing drag imparted on an aircraft afterbody fuselage, comprising:
    at least one first member protruding from the fuselage surface and capable of inducing a longitudinal vortex; and
    at least one second member protruding from the fuselage surface and capable of inducing a longitudinal vortex, wherein the longitudinal vortex induced by said at least one first member combines with the longitudinal vortex induced by said at least one second member to create a single merged vortex.

2. The vortex controller of claim 1, wherein said at least one first member and said at least one second member each possess an aft end and a leading edge, and wherein said at least one first member and said at least one second member are positioned on the fuselage surface such that said aft ends of said at least one first member and said at least one second member are positioned just above the region of separated flow of the undersurface of the afterbody.

3. The vortex controller of claim 2, wherein said leading edges of said at least one first member and said at least one second member are situated on the fuselage surface such that the longitudinal axis of each said at least one first member and said at least one second member is angled nose-down from the local afterbody streamline at the design case.

4. The vortex controller of claim 2, wherein said leading edges of said at least one first member and said at least one second member are situated on the fuselage surface such that the longitudinal axis of each said at least one first member and said at least one second member is between 10 and 20 degrees nose-down from the local afterbody streamline at the design case.

5. The vortex controller of claim 2, wherein said aft end of said at least one second member is positioned forward of the predicted burst location of said at least one first member.

6. The vortex controller of claim 1, wherein the single merged vortex created by the combined induced longitudinal vortices of said at least one first member and said at least one second member travels along the undersurface of the afterbody to reenergize the fuselage boundary layer to prevent undersurface flow separation and reduce overall afterbody drag.

7. The vortex controller of claim 2, wherein said at least one first member and said at least one second member are fin-like, parabolic-shaped members.

8. The vortex controller of claim 2, wherein said leading edge of each said at least one first member and said at least one second member are rounded, and wherein said aft end of each said at least one first member and said at least one second member are thinned.

9. A vortex controller for reducing drag imparted on an aircraft afterbody fuselage, comprising:

- at least one first member protruding substantially perpendicularly from the fuselage surface and capable of inducing a longitudinal vortex, said at least one first member having an aft end and a leading edge;
- at least one second member protruding substantially perpendicularly from the fuselage surface and capable of inducing a longitudinal vortex, said at least one second member having an aft end and a leading edge; and
- wherein said at least one first member and said at least one second member are positioned on the fuselage surface such that said aft ends of said at least one first member and said at least one second member are positioned just above the region of separated flow of the undersurface of the afterbody, and wherein said leading edges of said at least one first member and said at least one second member are situated on the fuselage surface such that the longitudinal axis of each said at least one first member and said at least one second member is angled nose-down from the local afterbody streamline at the design case.

10. The vortex controller of claim 9, wherein said leading edges of said at least one first member and said at least one second member are situated on the fuselage surface such that the longitudinal axis of each said at least one first member and said at least one second member is between 10 and 20 degrees nose-down from the local afterbody streamline at the design case.

11. The vortex controller of claim 9, wherein said aft end of said at least one second member is positioned forward of the predicted burst location of said at least one first member.

12. The vortex controller of claim 9, wherein the single merged vortex created by the combined induced longitudinal vortices of said at least one first member and said at least one second member travels along the undersurface of the afterbody to reenergize the fuselage boundary layer to prevent undersurface flow separation and reduce overall afterbody drag.

13. The vortex controller of claim 9, wherein said at least one first member and said at least one second member are fin-like, parabolic-shaped members.

14. The vortex controller of claim 9, wherein said leading edge of each said at least one first member and said at least one second member are rounded, and wherein said aft end of each said at least one first member and said at least one second member are thinned.

15. A vortex controller for reducing drag imparted on an aircraft afterbody fuselage, comprising:

- at least one first member protruding substantially perpendicularly from the fuselage surface and capable of inducing a longitudinal vortex, said at least one first member having an aft end and a leading edge;
- at least one second member protruding substantially perpendicularly from the fuselage surface and capable of inducing a longitudinal vortex, said at least one second member having an aft end and a leading edge, said aft end of said at least one second member positioned forward of the predicted burst location of said at least one first member;
- wherein said at least one first member and said at least one second member are positioned on the fuselage surface such that said aft ends of said at least one first member and said at least one second member are positioned just above the region of separated flow of the undersurface of the afterbody, and wherein said leading edges of said at least one first member and said at least one second member are situated on the fuselage surface such that the longitudinal axis of each said at least one first member and said at least one second member is angled nose-down from the local afterbody streamline at the design case; and
- at least one tail bumper fairing.

16. A method of reducing drag imparted on an aircraft afterbody fuselage, said method comprising the steps of:

a. applying at least one first vortex control device to the fuselage surface such that the cross-section centerline of said at least one first vortex control device is normal to the fuselage surface;

b. inducing a longitudinal vortex via said at least one first vortex control device;

c. applying at least one second vortex control device to the fuselage surface such that the cross-section centerline of said at least one second vortex control device is normal to the fuselage surface;

d. inducing a longitudinal vortex via said at least one second vortex control device; and, e. combining the longitudinal vortex induced by said at least one first vortex control device with the longitudinal vortex induced by said at least one second vortex control device to create a single merged vortex.

* * * * *